US012441104B2

(12) United States Patent
Arakane

(10) Patent No.: US 12,441,104 B2
(45) Date of Patent: Oct. 14, 2025

(54) LIQUID EJECTION APPARATUS, LIQUID EJECTION SYSTEM, AND STORAGE MEDIUM STORING PROGRAM

(71) Applicant: BROTHER KOGYO KABUSHIKI KAISHA, Nagoya (JP)

(72) Inventor: Satoru Arakane, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 187 days.

(21) Appl. No.: 18/067,928

(22) Filed: Dec. 19, 2022

(65) Prior Publication Data

US 2023/0234350 A1 Jul. 27, 2023

(30) Foreign Application Priority Data

Jan. 26, 2022 (JP) ................................ 2022-010068

(51) Int. Cl.
*B41J 2/145* (2006.01)
*B41J 2/045* (2006.01)

(52) U.S. Cl.
CPC ....... *B41J 2/04536* (2013.01); *B41J 2/04586* (2013.01)

(58) Field of Classification Search
CPC ..... B41J 2/045; B41J 2/145; B41J 2/15; B41J 2/14; B41J 2/21; B41J 29/38; B41J 11/42; G06K 15/02; G06F 15/00
See application file for complete search history.

(56) References Cited

U.S. PATENT DOCUMENTS 5,844,585 A * 12/1998 Kurashima .......... G06K 15/105 347/41
6,595,614 B2 * 7/2003 Morikawa .............. B41J 11/425 347/41
7,370,927 B2 * 5/2008 Kuruma ................... B41J 29/38 347/14
7,726,763 B2 * 6/2010 Ochiai ................... B41J 2/2132 347/15
9,469,123 B2 * 10/2016 Tsuboi ................... B41J 2/2107
9,701,118 B2 * 7/2017 Naito ................... B41J 2/14233
2004/0090489 A1 * 5/2004 Hayashi ................. B41J 2/2132 347/41

(Continued)

FOREIGN PATENT DOCUMENTS

EP 1 216 838 A1 6/2002
JP 2002-210937 A 7/2002
JP 2007-320110 A 12/2007

*Primary Examiner* — John P Zimmermann
(74) *Attorney, Agent, or Firm* — Merchant & Gould P.C.

(57) ABSTRACT

A controller acquires ejection control data, the ejection control data being generated based on image data for one line of an image to be formed, the ejection control data including first data and second data, the first data indicating an amount of liquid ejected from a first nozzle in a first nozzle array, the second data indicating an amount of liquid ejected from a second nozzle in a second nozzle array; stores the acquired ejection control data in a memory; and performs an ejection operation of, while moving a carriage once, controlling a head to eject liquid from the first nozzle based on the first data and to eject liquid from the second nozzle based on the second data. The memory stores the ejection control data of an amount that is smaller than or equal to an amount required for performing the ejection operation twice.

14 Claims, 8 Drawing Sheets

(56) References Cited

U.S. PATENT DOCUMENTS

| | | | | |
|---|---|---|---|---|
| 2006/0119632 | A1* | 6/2006 | Ochiai | B41J 2/04543 347/15 |
| 2008/0049057 | A1* | 2/2008 | Ochiai | B41J 2/155 347/12 |
| 2008/0068411 | A1 | 3/2008 | Koase | |
| 2009/0015611 | A1* | 1/2009 | Ochiai | B41J 2/2146 347/12 |
| 2009/0073226 | A1* | 3/2009 | Chikuma | G06K 15/107 347/41 |
| 2011/0050799 | A1* | 3/2011 | Nishida | B41J 2/16532 347/30 |
| 2016/0193833 | A1* | 7/2016 | Matsuura | B41J 2/2132 347/12 |
| 2020/0101720 | A1* | 4/2020 | Arakane | B41J 29/38 |

* cited by examiner

LIQUID EJECTION APPARATUS, LIQUID EJECTION SYSTEM, AND STORAGE MEDIUM STORING PROGRAM

REFERENCE TO RELATED APPLICATIONS

This application claims priority from Japanese Patent Application No. 2022-010068 filed on Jan. 26, 2022. The entire content of the priority application is incorporated herein by reference.

BACKGROUND ART

A liquid ejection apparatus that forms dots on a medium with high resolution and at high speed is known.

DESCRIPTION

A liquid ejection apparatus has a first nozzle array in which a plurality of nozzles are arranged at a particular pitch, and a second nozzle array in which a plurality of nozzles are arranged at the same pitch, the second nozzle array being shifted in a direction in which the nozzles are arranged relative to the position of the first nozzle array.

In order to perform an ejection process in a liquid ejection apparatus, ejection control data indicating amounts of liquid to be ejected from nozzles is required. The ejection control data is generated by the liquid ejection apparatus, or is generated by an external apparatus (for example, a personal computer) and transmitted from the external apparatus to the liquid ejection apparatus. In either case, in order to reduce a memory size of the liquid ejection apparatus, it is advantageous that the amount of ejection control data is small.

In view of the foregoing, an example of an object of this disclosure is to reduce an amount of ejection control data in a case where positions of nozzles are shifted for each nozzle array.

According to one aspect, this specification discloses a liquid ejection apparatus. The liquid ejection apparatus includes a head, a carriage, a memory, and a controller. The head includes at least a first nozzle array and a second nozzle array. The first nozzle array includes nozzles arranged at a particular pitch in a first direction. The second nozzle array includes nozzles arranged at the particular pitch in the first direction. The nozzles in the second nozzle array are located at positions shifted from the nozzles in the first nozzle array in the first direction. The head is mounted on the carriage. The carriage is configured to move in a second direction crossing the first direction. The controller is configured to: acquire ejection control data, the ejection control data being generated based on image data for one line of an image to be formed, the ejection control data including first data and second data, the first data indicating an amount of liquid ejected from a first nozzle in the first nozzle array, the second data indicating an amount of liquid ejected from a second nozzle in the second nozzle array; store the acquired ejection control data in the memory; and perform an ejection operation of, while moving the carriage once, controlling the head to eject liquid from the first nozzle based on the first data included in the ejection control data stored in the memory and to eject liquid from the second nozzle based on the second data included in the ejection control data stored in the memory. The memory is configured to store the ejection control data of an amount that is smaller than or equal to an amount required for performing the ejection operation twice. Thus, in a case where the positions of the nozzles are shifted between the first and second nozzle arrays, the data amount of ejection control data is reduced. According to other aspects, this specification also discloses a liquid ejection system including a first controller and a second controller, and a non-transitory computer-readable storage medium storing a set of program instructions for a liquid ejection apparatus.

Figure 1:
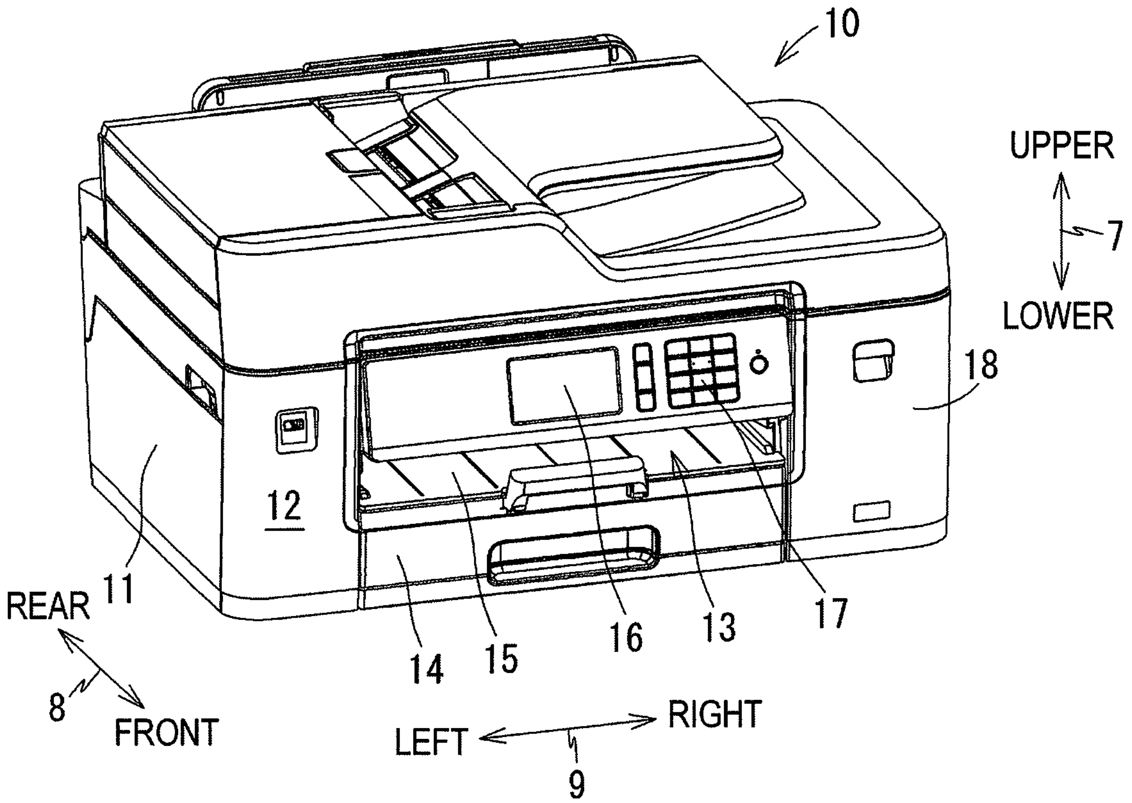
FIG. 1 is an external perspective view of a printer 10.

Hereinafter, an embodiment of the present disclosure will be described. An upper-lower direction 7 is defined with reference to a state in which a printer 10 is installed for use (the state shown in FIG. 1), a front-rear direction 8 is defined assuming that a surface of the printer 10 in which an opening 13 is formed as the front surface, and a left-right direction 9 is defined when the printer 10 is viewed from the front. The upper-lower direction 7, the front-rear direction 8, and the left-right direction 9 are perpendicular to each other.

[Overview of Printer 10]

The printer 10 according to this embodiment is an example of a liquid ejection apparatus that ejects liquid onto a sheet by an inkjet printing method. The printer 10 is a monochrome printer that ejects black ink (an example of liquid) onto a sheet. The printer 10 may be a so-called "multifunction peripheral (MFP)" having functions such as a facsimile function, a scan function, and a copy function.

Figure 2:
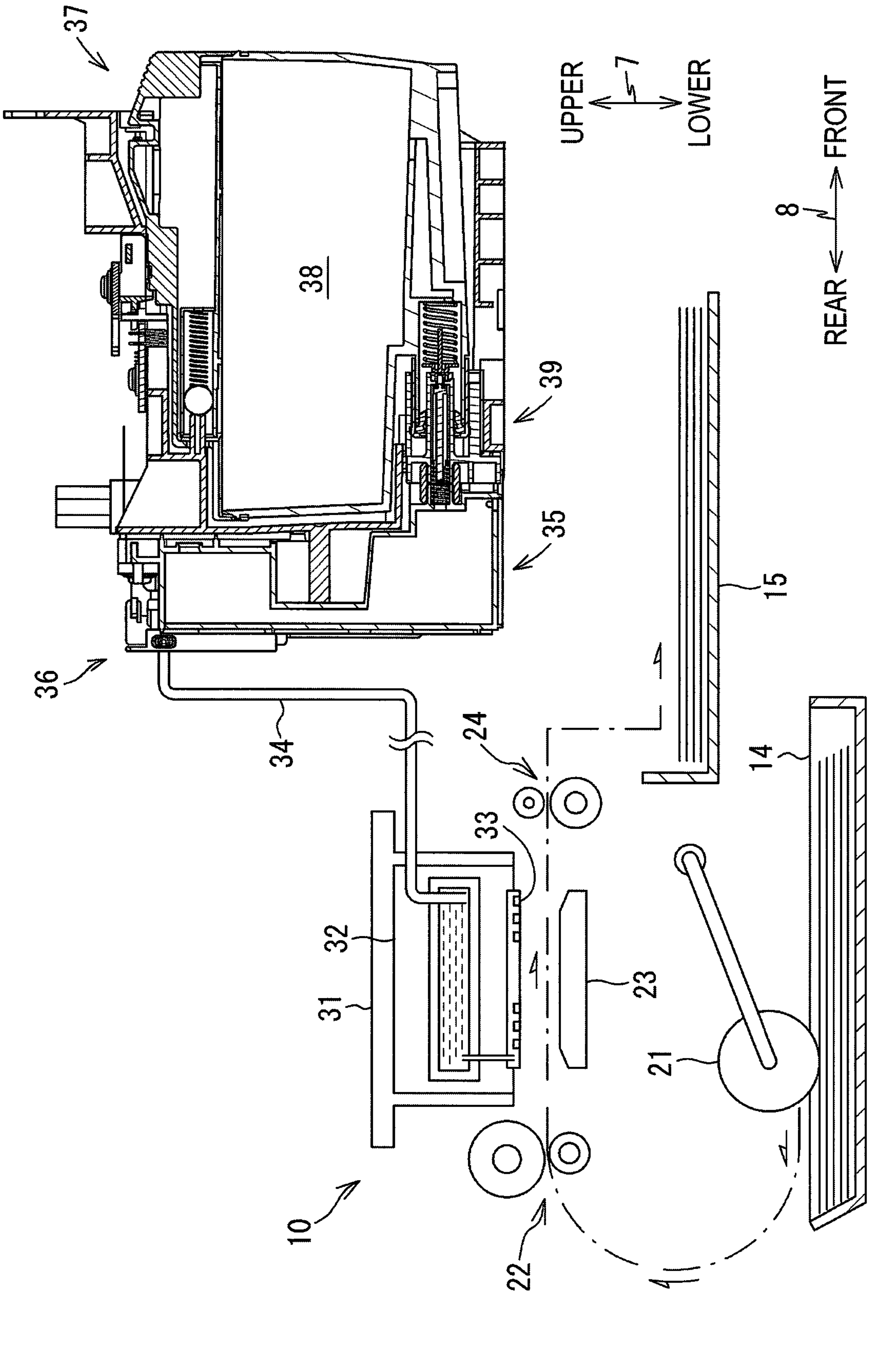
FIG. 2 is a vertical cross-sectional view schematically showing an internal structure of the printer 10.

The printer 10 has a housing 11 having a generally rectangular parallelepiped shape. As shown in FIGS. 1 and 2, a feed tray 14, a feed roller 21, a conveyance roller 22, a carriage 31, a head 32 mounted on the carriage 31 and having a plurality of nozzles 33, a platen 23 facing the head 32, a discharge roller 24, a discharge tray 15, a sub-tank 35, a mount case 36 to which a cartridge 37 is attachable, and a tube 34 for communicating the cartridge 37 attached to the mount case 36 with the head 32 are located inside the housing 11.

The printer 10 drives the feed roller 21 and the conveyance roller 22 to convey the sheet supported by the feed tray 14 along a conveyance path (the path indicated by the single-dot chain line in FIG. 2) to the position of the platen 23. Next, the printer 10 causes the nozzles 33 of the head 32 to eject ink supplied from the cartridge 37 attached to the mount case 36 via the sub-tank 35 and the tube 34. Thereby, the ink lands on the sheet supported by the platen 23, and an image to be formed is printed on the sheet. The printer 10 drives the discharge roller 24 to discharge the sheet on which the image is printed to the discharge tray 15.

The carriage 31 is supported by two guide rails (not shown) extending in the left-right direction 9, and reciprocates in the left-right direction 9 crossing a conveyance direction (the front-rear direction 8) of the conveyance roller 22. The printer 10 ejects ink from the nozzles 33 of the head 32 while the carriage 31 moves in the left-right direction 9. Thereby, an image is printed on a partial area of the sheet facing the head 32. Next, the printer 10 causes the conveyance roller 22 to convey the sheet such that an area in which an image is to be printed next faces the head 32. An image is printed on the sheet by alternately and repeatedly executing these processes.

As shown in FIG. 1, the housing 11 has a cover 18 on a front surface 12 of the housing 11 and at the right end in the left-right direction 9. An opening (not shown) is formed at the position of the cover 18. The cover 18 is pivotable between a position for closing the opening (the position shown in FIG. 1) and a position for opening the opening. One mount case 36 is located in an accommodation space inside the housing 11 that extends to the depth of the opening. The cartridge 37 storing black ink is attached to the mount case 36.

The cartridge 37 has a liquid chamber 38 (see FIG. 2) configured to store ink. When the cartridge 37 is attached to the mount case 36, the ink stored in the liquid chamber 38 flows into the sub-tank 35 via an ink channel 39 communicating the liquid chamber 38 and the sub-tank 35. The sub-tank 35 temporarily stores the ink that has flowed in. The ink stored in the sub-tank 35 is supplied to the head 32 via the tube 34.

[Controller 40]

Figure 3:
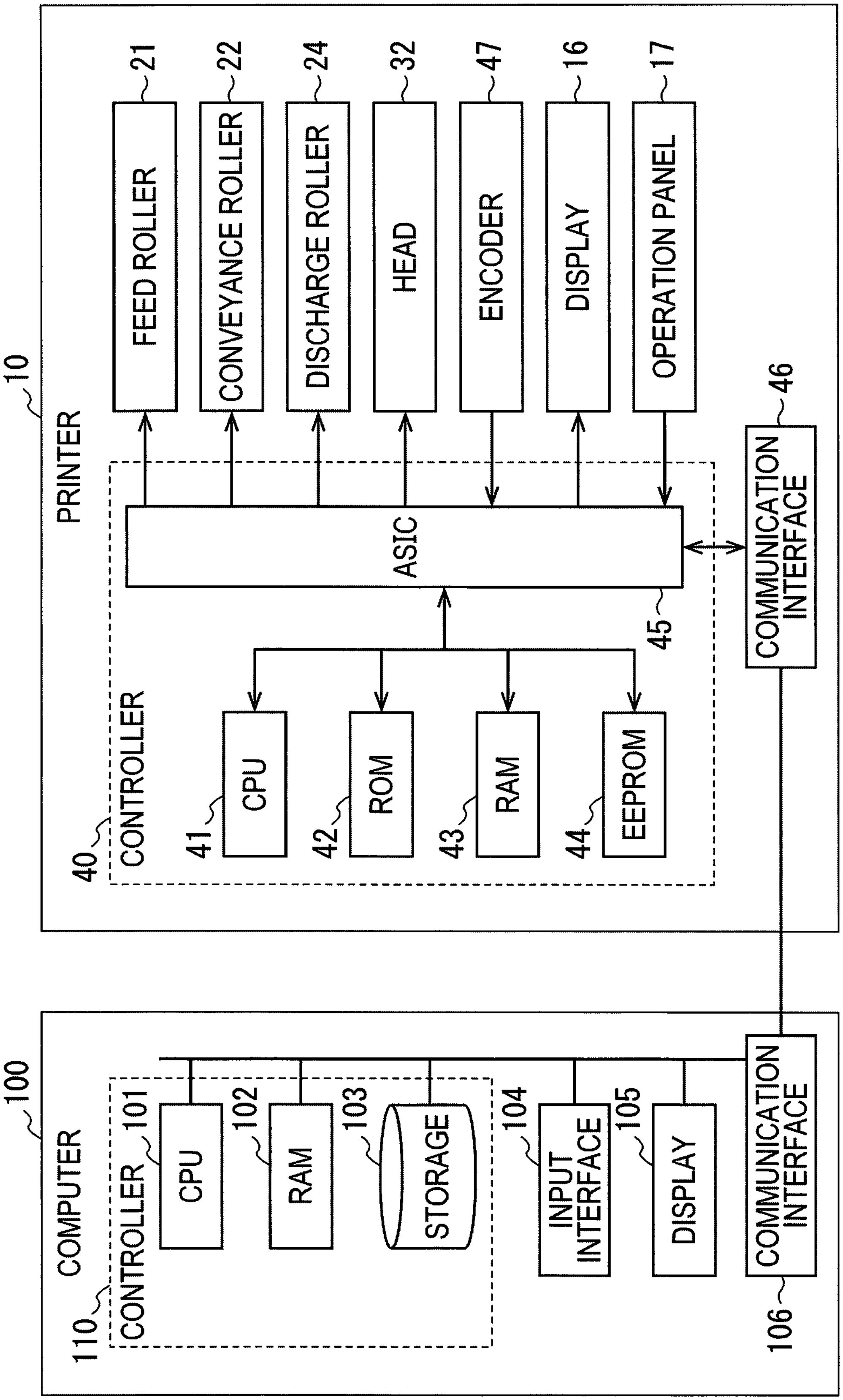
FIG. 3 is a block diagram of a print system including the printer 10 and a computer 100.

A controller 40 shown in FIG. 3 is located inside the housing 11. The controller 40 includes a CPU 41, a ROM 42, a RAM 43, an EEPROM 44, and an ASIC 45. The ROM 42 stores programs and so on for the CPU 41 to execute various processes. The RAM 43 is used as a storage area for temporarily storing data and signals used when the CPU 41 executes programs, or as a work area for data processing. The EEPROM 44 stores information to be kept even after the power is turned off. The ROM 42, the RAM 43, and the EEPROM 44 are examples of a memory of the printer 10.

The ASIC 45 is for operating the feed roller 21, the conveyance roller 22, the discharge roller 24, and the head 32. The controller 40 drives a motor (not shown) via the ASIC 45, thereby rotating the feed roller 21, the conveyance roller 22, and the discharge roller 24. The controller 40 outputs drive signals to drive elements (not shown) of the head 32 via the ASIC 45, thereby causing the nozzles 33 of the head 32 to eject ink. The ASIC 45 outputs drive signals corresponding to the amount of ink to be ejected from the nozzles 33.

An encoder 47 is connected to the ASIC 45. The encoder 47 alternately outputs a first level signal and a second level signal as the carriage 31 moves in the left-right direction 9. The controller 40 receives output signals of the encoder 47 via the ASIC 45. The controller 40 acquires the position and movement speed of the carriage 31 based on the received output signals of the encoder 47.

A display 16 and an operation panel 17 are connected to the ASIC 45. The display 16 is, for example, a liquid crystal display, an organic EL display, and so on. The display 16 displays, for example, the status of the printer 10 on the screen. The operation panel 17 outputs, to the controller 40, an operation signal in response to an operation by a user. The operation panel 17 may have push buttons, for example, and/or may have a touch sensor superimposed on the display 16.

A communication interface 46 is connected to the ASIC 45. The communication interface 46 is an interface for performing communication between the printer 10 and other devices. The communication interface 46 is, for example, a wireless or wired communication interface such as USB, Wi-Fi, Bluetooth ("Wi-Fi is a registered trademark of Wi-Fi Alliance. "Bluetooth" is a registered trademark of Bluetooth SIG, Inc.). The printer 10 performs communication with other devices connected to the printer 10 by controlling the communication interface 46.

[Computer 100]

In the print system shown in FIG. 3, a computer 100 is connected to the printer 10. The computer 100 is any type of computer connectable to the printer 10. The computer 100 is, for example, a personal computer, a mobile phone, and so on. The computer 100 includes a CPU 101, a RAM 102, a storage 103, an input interface 104, a display 105, and a communication interface 106. The CPU 101, the RAM 102, and the storage 103 function as a controller 110 of the computer 100. The storage 103 is, for example, a hard disk, an SSD drive, and so on. The storage 103 stores programs and so on for the CPU 101 to execute various processes. The programs stored in the storage 103 include a printer driver for controlling the printer 10. The RAM 102 is used as a storage area for temporarily storing data and signals used when the CPU 101 executes programs, or as a work area for data processing. The communication interface 106 is an interface for performing communication with the printer 10.

The print system shown in FIG. 3 is an example of a liquid ejection system. The controller 110 is an example of a first controller of the liquid ejection system. The controller 40 is an example of the controller of the liquid ejection apparatus and also an example of a second controller of the liquid ejection system. The RAM 102 and the storage 103 are examples of a memory of the liquid ejection system.

The CPU 41 of the controller 40 of the printer 10 executes programs stored in the RAM 43, thereby executing various processes. The CPU 101 of the controller 110 of the computer 100 executes programs stored in the RAM 102, thereby executing various processes. These programs may be stored in a computer-readable storage medium. The computer-readable storage medium is a non-transitory medium. The non-transitory mediums include recording mediums such as a CD-ROM and a DVD-ROM in addition to a ROM, a RAM, an EEPROM, a hard disk, and an SSD drive. The non-transitory medium is also a tangible medium. In contrast, an electrical signal that carries a program downloaded from a server on the Internet is a computer-readable signal medium, which is a kind of computer-readable medium, but is not included in a non-transitory computer-readable storage medium.

[Arrangement of Nozzles 33]

Figure 4C:
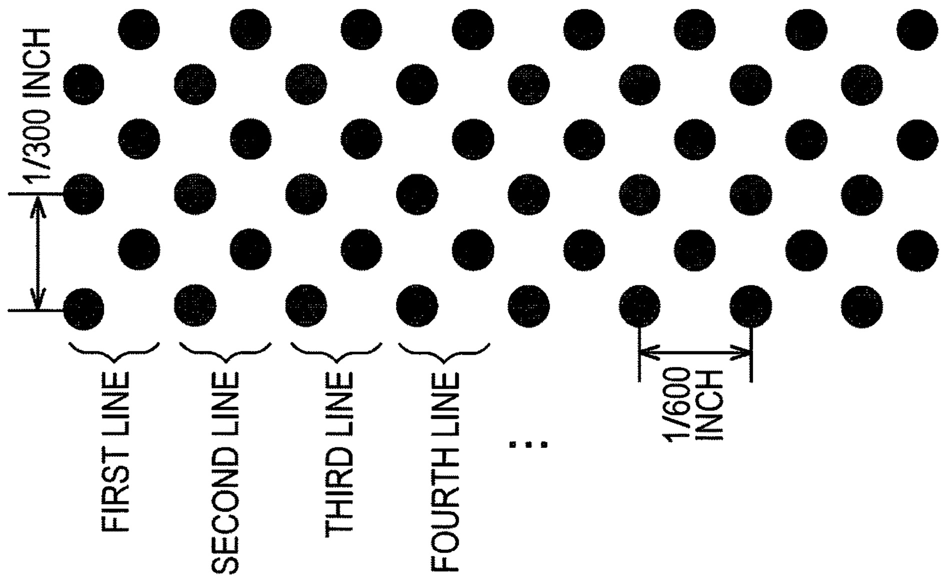
FIG. 4C is an enlarged view of an image printed in a high speed mode.
Figure 4B:
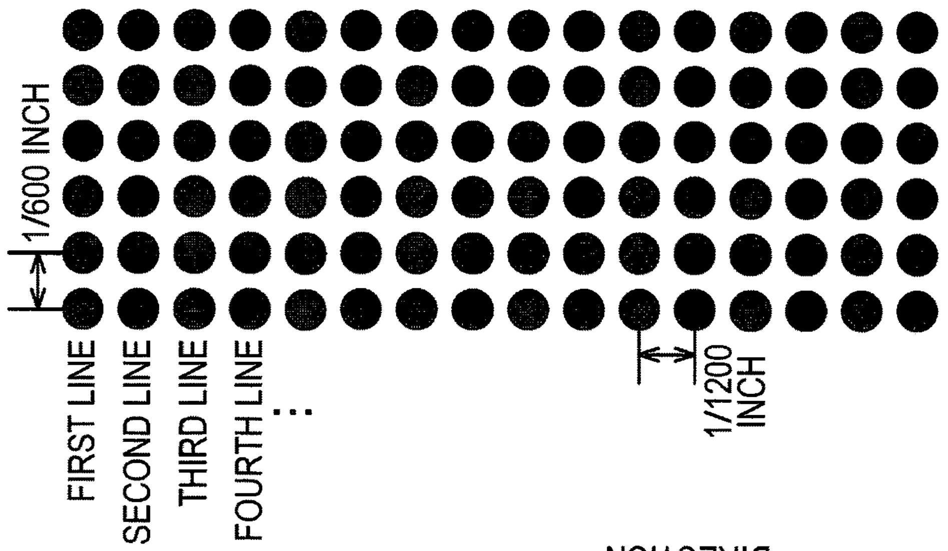
FIG. 4B is an enlarged view of an image printed in a high quality mode.
Figure 4A:
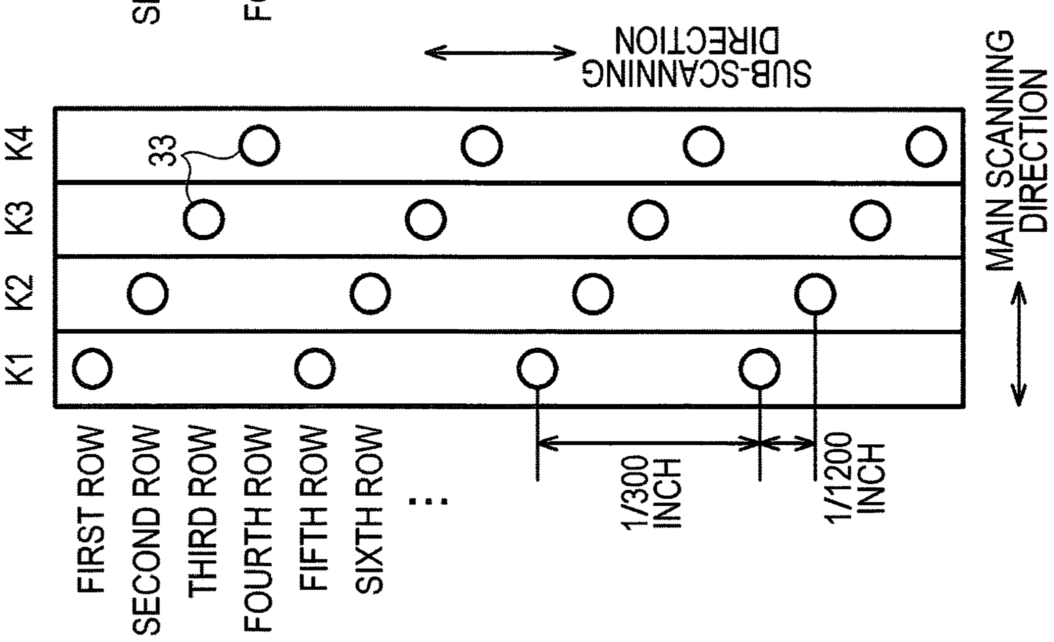
FIG. 4A is a diagram showing an arrangement of nozzles 33 in a head 32.

FIG. 4A shows an arrangement of the nozzles 33 in the head 32. In FIG. 4A, the horizontal direction is the moving direction of the carriage 31, and the vertical direction is a sheet conveyance direction. In the following description, the former is referred to as a main scanning direction and the latter is referred to as a sub-scanning direction. In this embodiment, the main scanning direction and the sub-scanning direction are perpendicular to each other. The white circles shown in FIG. 4A indicate the positions of the nozzles 33 when the head 32 is viewed from above.

The head 32 includes a first nozzle array K1, a second nozzle array K2, a third nozzle array K3, and a fourth nozzle array K4. The first nozzle array K1 is formed by arranging a plurality of nozzles 33 at a pitch P in the sub-scanning direction. Each of the second to fourth nozzle arrays K2 to K4 is formed by arranging the same number of nozzles 33 as the first nozzle array K1 at the same pitch P in the sub-scanning direction. In this embodiment, the pitch P is 1/300 inch. The second nozzle array K2 is located to the right of the first nozzle array K1. The third nozzle array K3 is located to the right of the second nozzle array K2. The fourth nozzle array K4 is located to the right of the third nozzle array K3. The distance between two nozzle arrays in the main scanning direction is arbitrary.

The positions of the nozzles 33 in the second nozzle array K2 in the sub-scanning direction are shifted by 1/4 of the pitch P (that is, 1/1200 inch) from the positions of the nozzles 33 in the first nozzle array K1 in the sub-scanning direction. The positions of the nozzles 33 in the third nozzle array K3 in the sub-scanning direction are shifted by 1/2 of the pitch P from the positions of the nozzles 33 in the first nozzle array K1 in the sub-scanning direction. The positions of the nozzles 33 in the fourth nozzle array K4 in the sub-scanning direction are shifted by 3/4 of the pitch P from the positions of the nozzles 33 in the first nozzle array K1 in the sub-scanning direction. Each nozzle 33 in the second nozzle array K2 is located between two adjacent nozzles 33 in the first nozzle array K1 in the sub-scanning direction. Each nozzle 33 in the fourth nozzle array K4 is located between two adjacent nozzles 33 in the third nozzle array K3 in the sub-scanning direction. The sub-scanning direction is an example of a first direction. The main scanning direction is an example of a second direction.

The nozzles 33 in the first to fourth nozzle arrays K1 to K4 are divided into groups of four in the order of arrangement in the sub-scanning direction, and the four nozzles 33 in each group correspond to each other. For example, the nozzles 33 located in the first to fourth rows correspond to each other, and the nozzles 33 located in the fifth to eighth rows correspond to each other.

Although four nozzles 33 are shown for each nozzle array in FIG. 4A, the actual number of nozzles 33 in each nozzle array is more than four. Further, although the head 32 includes four nozzle arrays, the head 32 may include two nozzle arrays, or an even number of nozzle arrays of six or more.

In FIG. 4A, the plurality of nozzles 33 are formed in the head 32 such that the positions of the nozzles in the sub-scanning direction are different among each nozzle array. Alternatively, a plurality of nozzles 33 may be formed on the head 32 such that the positions of the nozzles in the sub-scanning direction are the same among each nozzle array, and the head 32 may be mounted on the carriage 31 in a state where the head 32 is tilted by a small angle (rotated by a small angle in the horizontal plane).

[Operating Mode of Printer 10]

The printer 10 operates in either a high image quality mode or a high speed mode. FIG. 4B shows an enlarged image printed in the high image quality mode. FIG. 4C shows an enlarged image printed in the high speed mode. Black circles shown in FIGS. 4B and 4C indicate dots formed by ink ejected from the nozzles 33.

In the high image quality mode (FIG. 4B), the carriage 31 moves at a particular speed in the main scanning direction. Each time the carriage 31 moves in the main scanning direction by 1/600 inch, ink is ejected from the nozzles 33 in the first to fourth nozzle arrays K1 to K4. In this case, one line of an image is formed by a dot group of ink ejected from one nozzle 33. Thus, in the high image quality mode, an image having a resolution of 600 dpi in the main scanning direction and a resolution of 1200 dpi in the sub-scanning direction is printed on a sheet.

In the high speed mode (FIG. 4C), the carriage 31 moves in the main scanning direction at a faster speed than in the high image quality mode. Each time the carriage 31 moves in the main scanning direction by 1/300 inch, ink is ejected from the nozzles 33 in the first nozzle array K1 to the fourth nozzle array K4. However, the ink ejection timing from the nozzles 33 in the second nozzle array K2 and the fourth nozzle array K4 is later than the ink ejection timing from the nozzles 33 in the first nozzle array K1 and the third nozzle array K3 by the time in which the carriage 31 moves 1/600 inch in the main scanning direction.

In this case, one line of an image is formed by a dot group of ink ejected from one nozzle 33 and a dot group of ink ejected from an adjacent nozzle 33. Specifically, an odd-numbered line (first line, third line, . . . , in FIG. 4C) of the image is formed by a dot group of ink ejected from the nozzles 33 in the first nozzle array K1 and a dot group of ink ejected from the nozzles 33 in the second nozzle array K2. An even-numbered line (second line, fourth line, . . . , in FIG. 4C) of the image is formed by a dot group of ink ejected from the nozzles 33 in the third nozzle array K3 and a dot group of ink ejected from the nozzles 33 in the fourth nozzle array K4. The interval between dots in the main scanning direction is 1/600 inch. Thus, in the high speed mode, an image with a resolution of 600 dpi in the main scanning direction and a resolution of 600 dpi in the sub-scanning direction is printed. In the high speed mode, the nozzle 33 in the first nozzle array K1 and the corresponding nozzle 33 in the second nozzle array K2, in combination, eject liquid to form one line (an odd-numbered line) of the image. The nozzle 33 in the third nozzle array K3 and the corresponding nozzle 33 in the fourth nozzle array K4, in combination, eject liquid to form one line (an even-numbered line) of the image.

The distance in the main scanning direction between dots of ink ejected from the first nozzle array K1 is 1/600 inch in the high image quality mode and 1/300 inch in the high speed mode. Thus, the distance in the main scanning direction between dots of ink ejected from the nozzles 33 in the first nozzle array K1 in the high speed mode is greater than the distance in the main scanning direction between dots of ink ejected from the nozzles 33 in the first nozzle array K1 in the high image quality mode.

[High-Speed Mode Printing]

Figure 5:
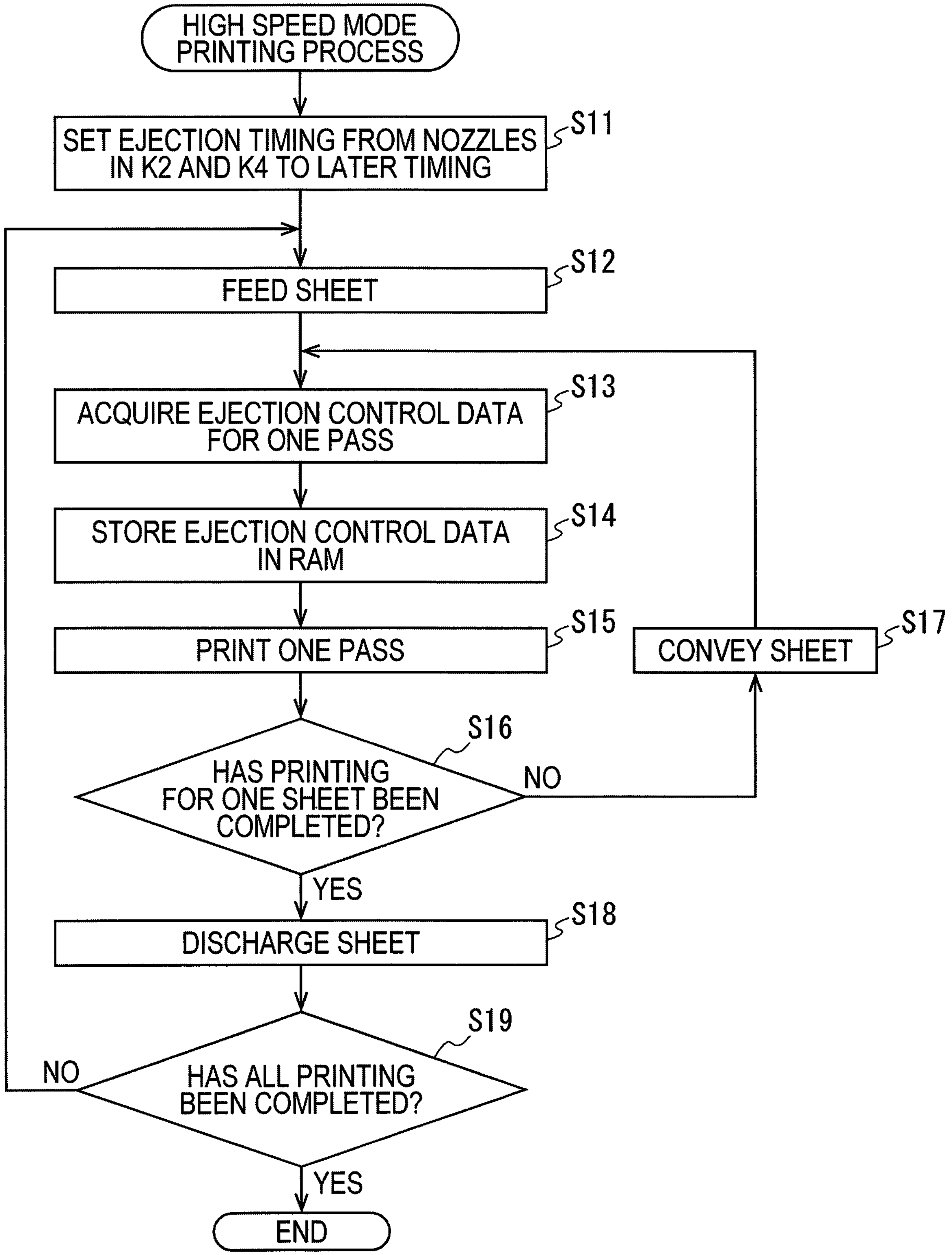
FIG. 5 is a flowchart of a high speed mode printing process.

In response to receiving an instruction for high-speed mode printing, the controller 40 of the printer 10 executes a high-speed mode printing process shown in FIG. 5. As described below, in the high-speed mode printing process, the controller 40 executes a process of acquiring ejection control data for each line of image data, a process of storing the acquired ejection control data in the RAM 43, and a process of moving the carriage 31 once and ejecting ink from the nozzles 33 of the head 32 based on the ejection control data. The ejection control data is data indicating the amount of ink ejected from each nozzle 33.

At the beginning of the high-speed mode printing process (FIG. 5), the controller 40 sets the ink ejection timing from the nozzles 33 in the second nozzle array K2 and the fourth nozzle array K4 to a timing later than the ink ejection timing from the nozzles 33 in the first nozzle array K1 and the third nozzle array K3 by the time required for the carriage 31 to move by 1/600 inch (S11).

Next, the controller 40 feeds a sheet supported by the feed tray 14 (S12). In S12, the controller 40 drives a feed motor (not shown). Thereby, the feed roller 21 feeds the sheet supported by the feed tray 14 to the conveyance path. The controller 40 also drives a conveyance motor (not shown). When the leading edge of the sheet fed to the conveyance path by the feed roller 21 reaches the conveyance roller 22, the conveyance roller 22 conveys the sheet forward along the conveyance path.

Next, the controller 40 acquires ejection control data necessary for printing for one pass (S13). The ejection control data is generated based on one line of image data of an image to be formed. The ejection control data includes data indicating the amount of ink ejected from the nozzles 33 of each nozzle array. Details of S13 will be described later.

Next, the controller 40 stores the ejection control data acquired in S13 in the RAM 43. The RAM 43 has a storage area for storing the ejection control data acquired in S13. The size of the storage area is equal to or smaller than the amount of ejection control data used for printing two passes (two ejection processes). The RAM 43 stores ejection control data of an amount equal to or smaller than the amount required for printing two passes.

Next, the controller 40 prints one pass on the sheet (S15). In one pass of printing, the controller 40 causes the nozzles 33 of the head 32 to eject ink while moving the carriage 31 once in a direction along the left-right direction 9. In S15, the controller 40 moves the carriage 31 to eject ink from all the nozzles 33 included in the head 32.

Next, the controller 40 determines whether printing for one sheet has been completed (S16). In response to determining in S16 that printing for one sheet has not been completed (S16: No), the controller 40 proceeds to S17. In this case, the controller 40 causes the sheet to be conveyed by a particular amount (S17). In S17, the controller 40 drives the conveyance motor to cause the conveyance roller 22 and the discharge roller 24 to convey the sheet by the particular amount. After that, the controller 40 proceeds to S13.

In response to determining in S16 that printing for one sheet has been completed (S16: Yes), the controller 40 proceeds to S18. In this case, the controller 40 causes the sheet to be discharged (S18). In S18, the controller 40 controls the conveyance rollers 22 and the discharge rollers 24 to convey the sheet by a particular amount and discharge the sheet to the discharge tray 15.

Next, the controller 40 determines whether all printing has been completed (S19). In response to determining in S19 that all printing has not been completed (S19: No), the controller 40 proceeds to S12. In this case, the controller 40 executes S12 to S18 to print the next page. In response to determining in S19 that all printing has been completed (S19: Yes), the controller 40 ends the high-speed mode printing process.

In FIG. 5, S13 is an example of an acquisition process. S14 is an example of a storage process. S15 is an example of an ejection process.

[Ejection Control Data Acquisition Method]

An original image used for printing in the printer 10 is, for example, an RGB color image with a resolution of 600 dpi in the main scanning direction and a resolution of 600 dpi in the sub-scanning direction. In order for the printer 10 to print a monochrome image in the high speed mode, the controller 110 of the computer 100 performs a color conversion process, a multi-value process, and a generation process on the RGB color image (see FIG. 6A).

The color conversion process is a process of converting image data of an original image into image data of a YCMK image having the same resolution. The multi-value process is a process of performing an area gradation conversion process, an error diffusion process, and so on, on image data of a K image (black image) included in the image data of the YCMK image, thereby acquiring image data (hereinafter referred to as multi-valued image data) having the same format as the image data of the K image and indicating the amount of ink ejected from each nozzle 33. The generation process is a process of generating ejection control data indicating the amount of ink ejected from each nozzle 33 of the head 32 based on the multi-valued image data.

The ejection control data generated by the controller 110 is transmitted from the computer 100 to the printer 10. The controller 40 of the printer 10 receives the ejection control data transmitted from the computer 100 in the acquisition process. The controller 40 stores the received ejection control data in the RAM 43. The controller 40 causes the nozzles 33 of the head 32 to eject the amount of ink corresponding to the ejection control data, based on the ejection control data stored in the RAM 43.

Figure 6A:
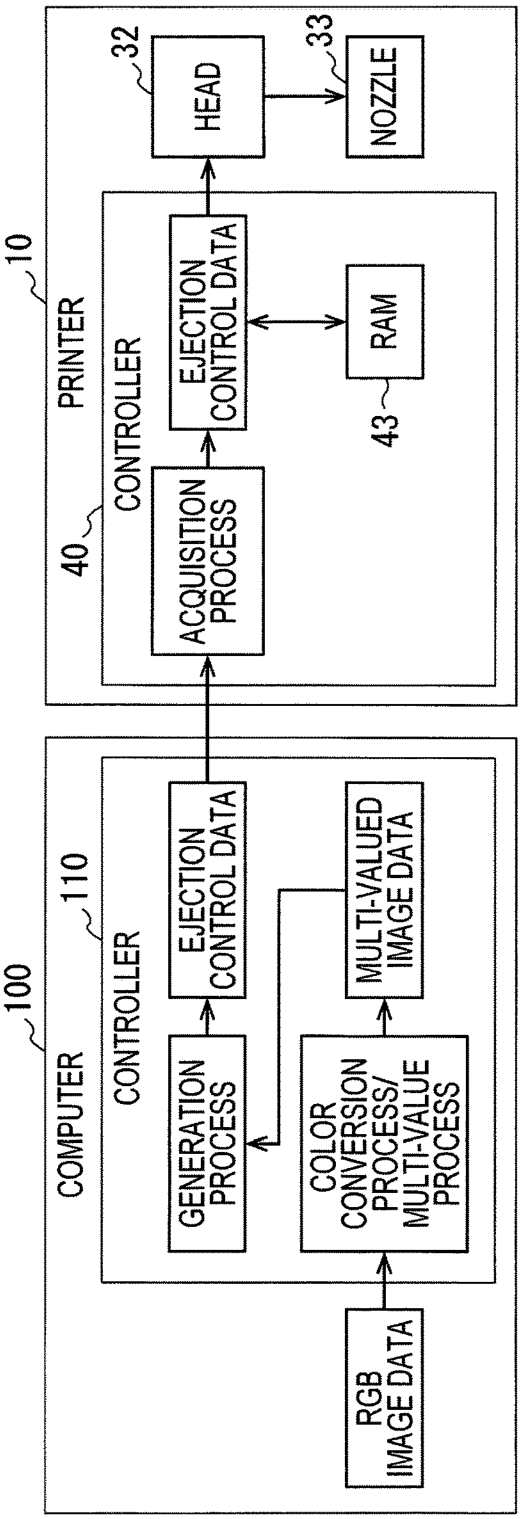
FIG. 6A is a diagram showing a first operating state of a print system.
Figure 6B:
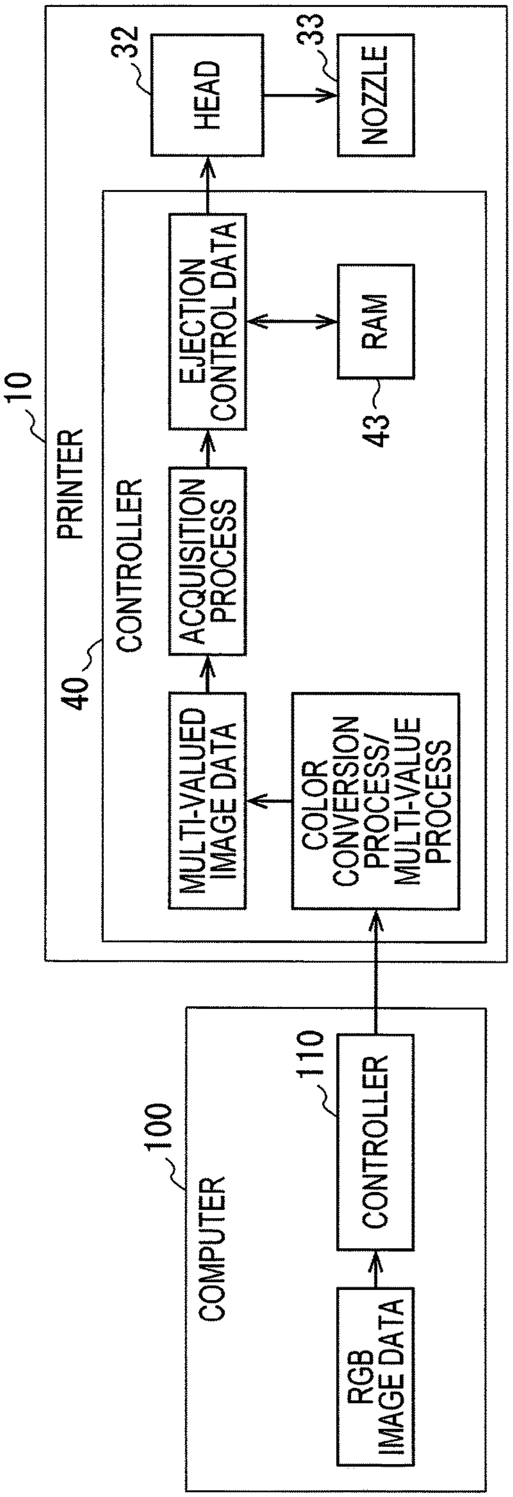
FIG. 6B is a diagram showing a second operating state of the print system.

Depending on the type of computer 100, the printer 10 operates in a state shown in FIG. 6B instead of a state shown in FIG. 6A. In this case, the computer 100 transmits image data of the RGB color image to the printer 10. The controller 40 of the printer 10 generates multi-valued image data by performing the color conversion process and the multi-value process on the image data of the RGB color image transmitted from the computer 100. In the acquisition process, the controller 40 generates ejection control data based on the multi-valued image data.

In the operating state shown in FIG. 6A, the memory (the RAM 102 and the storage 103) of the computer 100 stores programs such as a printer driver that causes the controller 110 to execute a series of processes including the generation process. The controller 110 executes a series of processes including the generation process by executing these programs. The controller 40 of the printer 10 executes the acquisition process, the storage process, and the ejection process by executing programs stored in the memory (the RAM 43 and the EEPROM 44) of the printer 10.

In the operating state shown in FIG. 6B, the memory of the printer 10 stores programs that cause the controller 40 to execute the acquisition process, the storage process, and the ejection process. The controller 40 executes the acquisition process, the storage process, and the ejection process by executing these programs.

Figure 7:
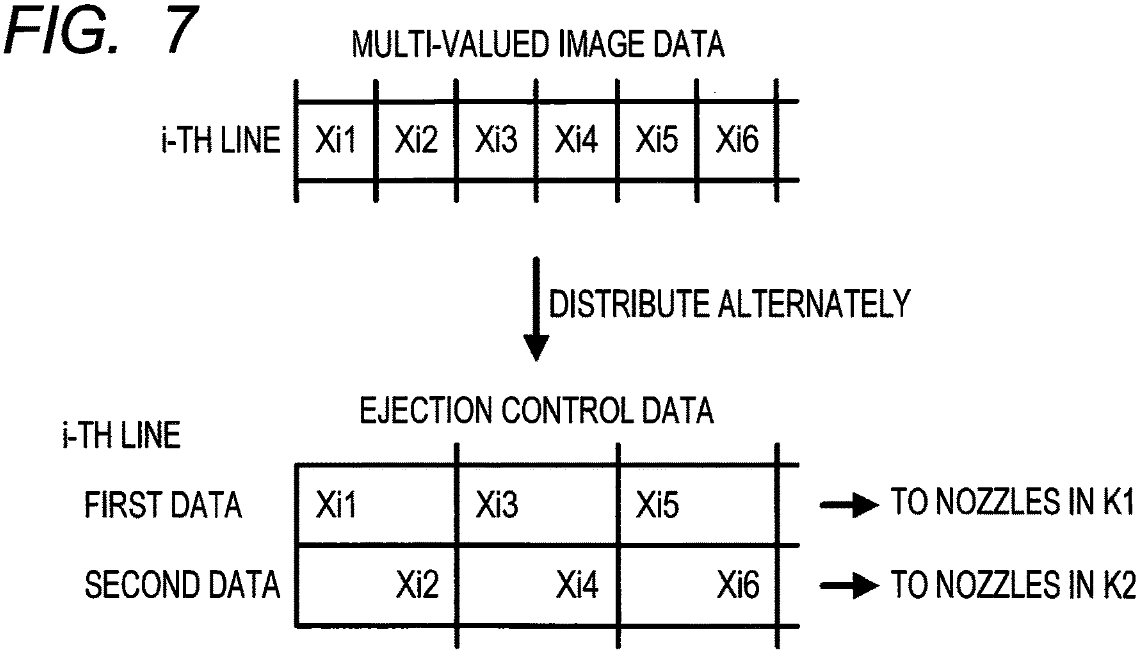
FIG. 7 is a diagram showing a method of generating ejection control data.
Figure 8A:
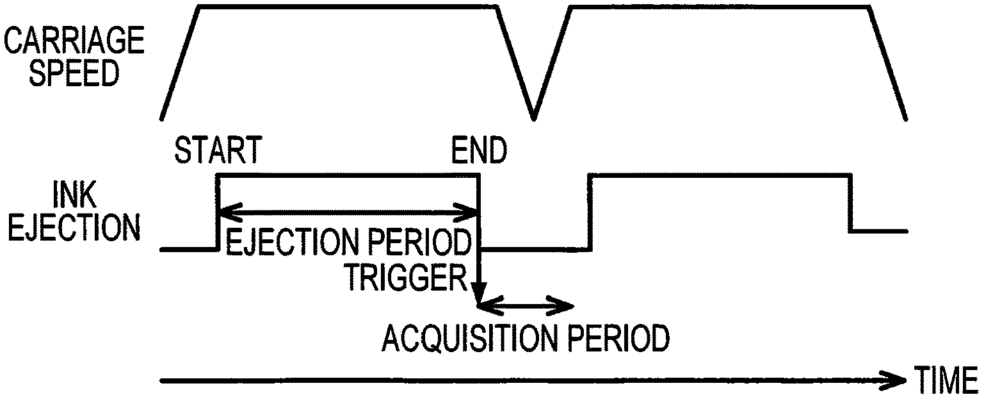
FIG. 8A is a diagram showing an ejection period and an acquisition period.
Figure 8B:
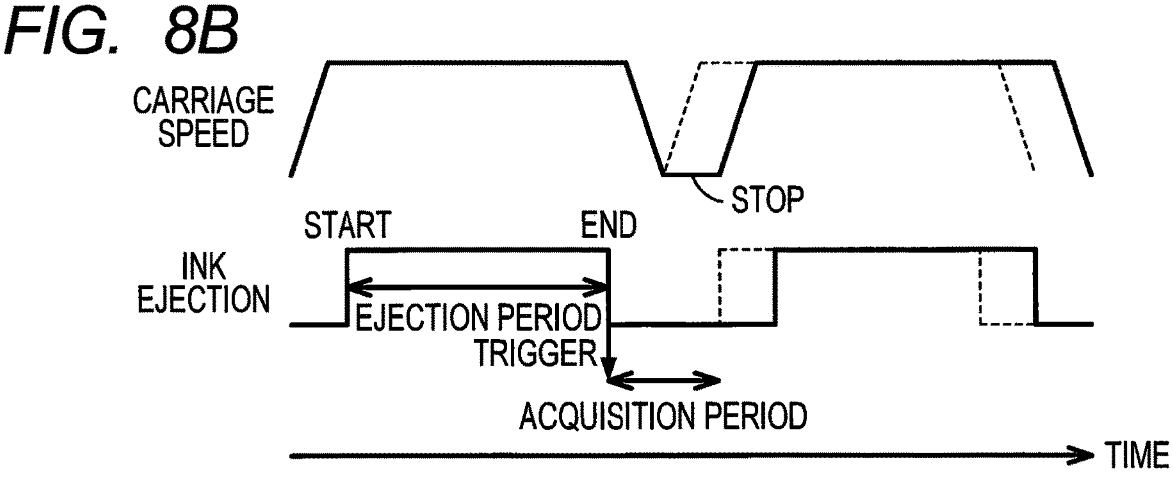
FIG. 8B is a diagram showing an ejection period and an acquisition period.

FIG. 7 shows an example of multi-valued image data. Signs "Xij" (j is a natural number) shown in FIG. 7 indicates multi-valued image data of the i-th line and the j-th column. In the generation process shown in FIG. 6A, among multi-valued image data Xi1, Xi2, Xi3, Xi4, . . . of the i-th line, the controller 110 of the computer 100 distributes image data Xi1, Xi3, Xi5, . . . of the odd-numbered columns to first data, and distributes image data Xi2, Xi4, Xi6, . . . of the even-numbered columns to second data, thereby generating ejection control data of the i-th line including the first data and the second data. The first data indicates the amount of ink ejected from the nozzles 33 in the odd-numbered nozzle arrays K1 and K3 among the first to fourth nozzle arrays K1 to K4. The second data indicates the amount of ink ejected from the nozzles 33 in the even-numbered nozzle arrays K2 and K4 among the first to fourth nozzle arrays K1 to K4. In the acquisition process shown in FIG. 6B, the controller 40 of the printer 10 generates ejection control data based on the multi-valued image data in a similar manner. In this manner, the ejection control data is generated by alternately distributing a plurality of data included in one line of multi-valued image data into the first data and the second data in the order in which the data are arranged.

The ejection control data could be generated by generating high-definition multi-valued image data with a resolution of 600 dpi in the main scanning direction and a resolution of 1200 dpi in the sub-scanning direction based on the multi-valued image data and then thinning out data from the high-definition multi-valued image data. However, according to the process shown in FIG. 7, the ejection control data is generated based on the multi-valued image data with a lower resolution, so the amount of the memory required for the process is suppressed. The nozzles 33 in the first nozzle array K1 are an example of first nozzles. The nozzles 33 in the second nozzle array K2 are an example of second nozzles. The ejection control data in an odd-numbered column is an example of first data. The ejection control data in an even-numbered column is an example of second data.

In S13, the controller 40 acquires ejection control data for each line of image data. The ejection control data is generated based on one line of image data of an image to be formed. The ejection control data includes first data and second data. The first date indicates the amount of ink ejected from the nozzles 33 in the first nozzle array. The second data indicates the amount of ink ejected from the nozzles 33 in the second nozzle array, the nozzles 33 corresponding to the first nozzles. In S14, the controller 40 stores the ejection control data acquired in S13 in the RAM 43.

In S15, while moving the carriage 31 once in the left-right direction 9, the controller 40 causes the nozzles 33 of the odd-numbered columns to eject ink based on the first data included in the ejection control data stored in the RAM 43 and also causes the nozzles 33 of the even-numbered columns to eject ink based on the second data included in the ejection control data stored in the RAM 43.

[Operations and Effects]

As described above, the printer 10 according to this embodiment includes the first nozzle array K1 and the second nozzle array K2 in which a plurality of nozzles 33 are arranged at the pitch P in the sub-scanning direction, the head 32 including the first nozzle array K1 and the second nozzle array K2, the carriage 31 on which the head 32 is mounted and which moves in the main scanning direction, the controller 40, and the RAM 43. The controller 40 executes the acquisition process (S13), the storage process (S14), and the ejection process (S15). The RAM 43 stores ejection control data of the amount equal to or less than the amount required for two ejection processes.

According to the printer 10 of this embodiment, in a case where the positions of the nozzles 33 are shifted among each nozzle array, the data amount of ejection control data is reduced. In the operating state shown in FIG. 6A, an image is generated based on the ejection control data generated by the computer 100 (an example of an external apparatus). In the operating state shown in FIG. 6B, an image is generated based on the ejection control data generated by the printer 10.

[Timing Control of Acquisition Process and Ejection Process]

In order to write and read ejection control data to and from the RAM 43 while suppressing the amount of memory used, it is advantageous that a period during which the controller 40 acquires the ejection control data (hereinafter referred to as an acquisition period) does not overlap a period during which the controller 40 ejects ink from the nozzles 33 of the head 32 using the ejection control data (hereinafter referred to as an ejection period). More specifically, the amount of memory used is suppressed to the amount of ejection control data for one pass by immediately using the acquired ejection control data for ejection, deleting the ejection control data from the memory, and acquiring the ejection control data for the next pass (that is, repeating the acquisition and the ejection alternately).

Three examples in which the acquisition period and the ejection period do not overlap when the RAM 43 stores an amount of ejection control data necessary for printing for one pass are described while referring to FIGS. 8A to 9C. Each of FIGS. 8A, 8B, 9A and 9C shows a waveform indicating the moving speed of the carriage 31 and a waveform indicating periods during which ink is ejected. The latter waveform is at a high level during the ejection period and at a low level during a period other than the ejection period.

Hereinafter, the period from the end of the ejection period in the preceding pass to the start of ejection in the subsequent pass is referred to as a non-ejection period. The length of the non-ejection period changes according to image data. For example, when the carriage 31 is moved rightward in the preceding pass to print an image up to the right end of the sheet and then the carriage 31 is moved leftward in the subsequent pass to print an image from the right end of the sheet, the non-ejection period is short. In contrast, when the carriage 31 is moved rightward in the preceding pass to print an image up to the right end of the sheet and then the carriage 31 is moved leftward in the subsequent pass to print an image from a position away from the right end of the sheet, the non-ejection period is long. In order for the acquisition period and the ejection period not to overlap, for example, the acquisition period should start when the ejection period ends, and the non-ejection period should be longer than the acquisition period.

In a first example (FIG. 8A), the controller 40 starts the acquisition process after the ejection process ends, and ends the acquisition process before the start of the next ejection process. In the operating state shown in FIG. 6A, the controller 40 of the printer 10 outputs an interrupt signal to the computer 100 when the ejection process ends. The controller 110 of the computer 100 starts the generation process by using the interrupt signal output from the printer 10 as a trigger. After the controller 110 ends the generation process and the controller 40 ends the acquisition process, the controller 40 starts the next ejection process. According to the first example, the ejection control data is acquired in time for the start of the next ejection process.

In a second example (FIG. 8B), in the ejection process, the controller 40 ejects ink from the nozzles 33 of the head 32 while the carriage 31 is moving at a constant speed. The controller 40 determines whether the acquisition process ends before the start of the next ejection process. In response to determining that the acquisition process does not end, the controller 40 stops the carriage 31 until the acquisition process ends. When the carriage 31 is stopped, the non-ejection period becomes longer than the original period. Thus, by stopping the carriage 31 as long as necessary, the non-ejection period is made longer than the acquisition period.

According to the second example, when ink is ejected while the carriage 31 is moving at a constant speed, the start of the next ejection process is delayed until the acquisition process ends, and the ejection control data is acquired in time for the start of the next ejection process.

Figure 9A:
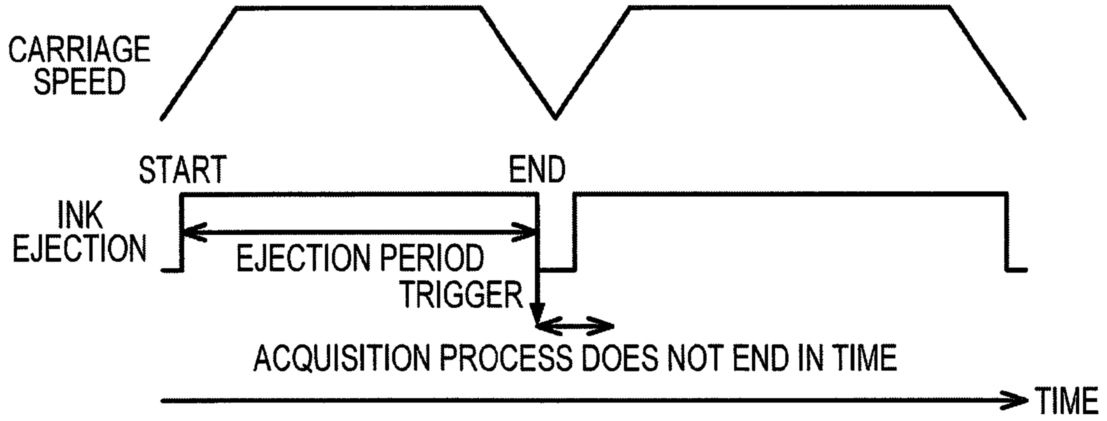
FIG. 9A is a diagram showing an example in which an acquisition process is not completed before start of a next ejection process.
Figure 9B:
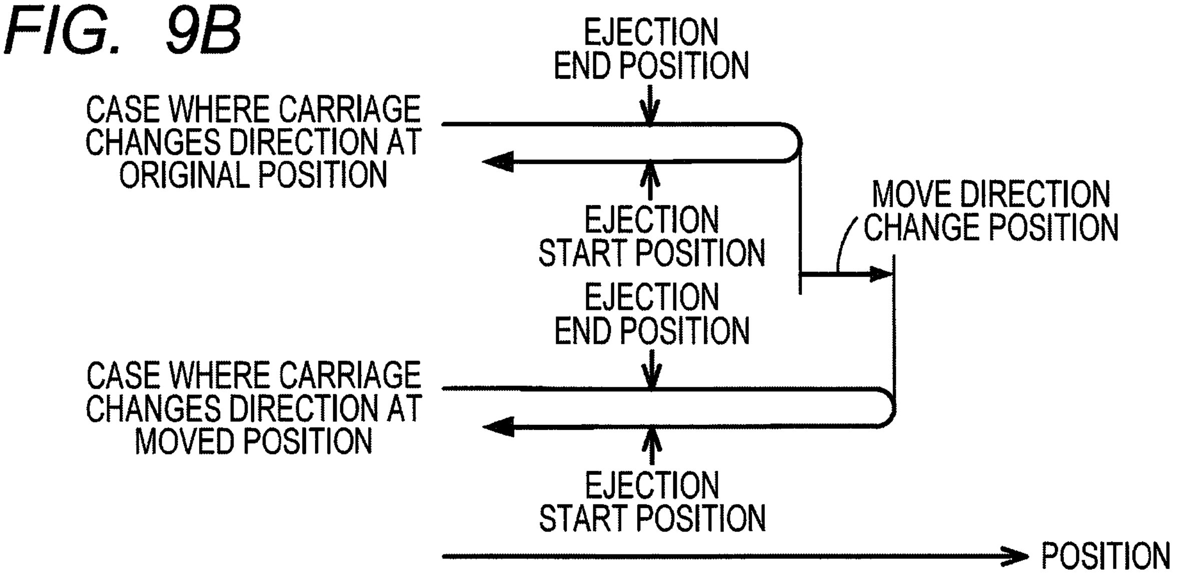
FIG. 9B is a diagram showing that a direction changing position of the carriage 31 is moved.
Figure 9C:
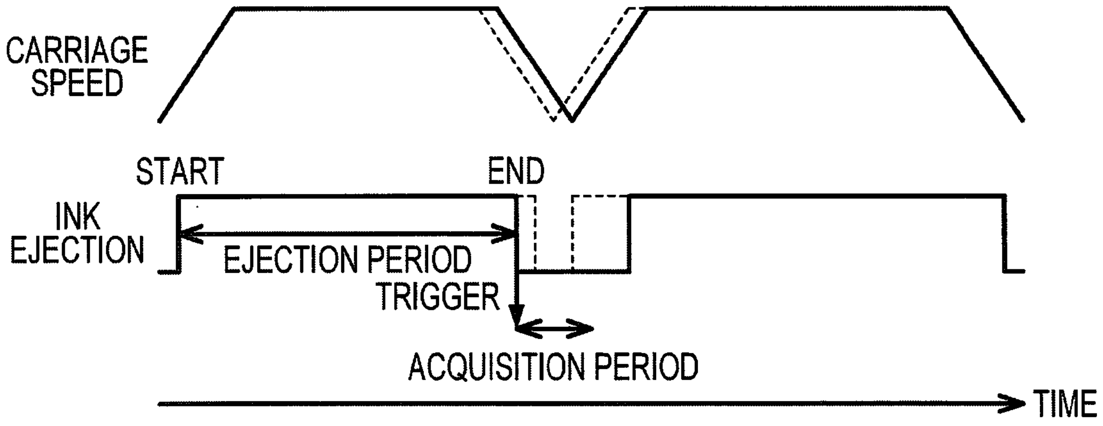
FIG. 9C is a diagram showing an ejection period and an acquisition period.

FIG. 9A shows an example of a case where the carriage ejects ink from the nozzles of the head while the carriage is moving at a constant speed, accelerating, and decelerating, and the acquisition process does not end before the start of the next ejection process. In the third example (FIG. 9C), in the ejection process, the controller 40 ejects liquid from the nozzles 33 of the head 32 during the constant-speed movement, acceleration movement, and deceleration movement of the carriage 31. The controller 40 determines whether the acquisition process ends before the start of the next ejection process. In response to determining that the acquisition process does not end, the controller 40 moves a direction change position of the carriage 31 farther from the original position (see FIG. 9B). If the direction change position of the carriage 31 is moved farther from the original position, compared with the case where the direction change position of the carriage 31 is located at the original position, the timing at which the carriage 31 starts decelerating in the preceding pass becomes later and the moving speed of the carriage 31 at the ejection end position becomes faster. Thus, the ejection period ends earlier. In the subsequent pass, the distance from the direction change position of the carriage 31 to the position where the nozzles 33 start ejecting ink becomes longer, and thus the ejection period starts later. As a result, the non-ejection period becomes longer than the original period. Thus, by moving the direction change position of the carriage 31 as far as necessary, the non-ejection period is made longer than the acquisition period.

According to the third example, when the liquid is ejected during the constant speed movement, acceleration movement, and deceleration movement of the carriage 31, the direction change position of the carriage 31 is moved farther than the original position, so that the ejection control data is acquired in time for the start of the next ejection process.

In a case where the RAM 43 has a free area capable of storing ejection control data larger than the amount required for one ejection process, the controller 40 may store ejection control data of an amount larger than the amount required for one ejection process in the free area of the RAM 43.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Thus, the disclosure is intended to embrace all known or later developed alternatives, modifications, variations, improvements, and/or substantial equivalents. Some specific examples of potential alternatives, modifications, or variations in the described invention are provided below:

The printer 10 of the above-described embodiment has the sub-tank 35. A printer according to a modification may not have the sub-tank 35. In the printer 10 of the above-described embodiment, the cartridge 37 is mounted in the mount case 36 outside the carriage 31. In a printer according to a modification, the cartridge 37 may be mounted in a mount case on the carriage 31. Further, the printer 10 of the above-described embodiment is a cartridge-type printer in which the cartridge 37 is detachably attached to the mount case 36. A printer according to a modification may be a tank-type printer that includes a tank and ink is filled in the tank.

The present disclosure may be applied to a liquid ejection apparatus in which the head 32 has an even number of nozzle arrays. In a liquid ejection apparatus including N (N is an even number) nozzle arrays, the pitch of the nozzles 33 in each nozzle array in the sub-scanning direction (hereinafter referred to as a nozzle pitch) is the same, and the nozzles in the first to the N-th nozzle arrays may be sequentially shifted by 1/N of the nozzle pitch in the sub-scanning direction. For example, in a liquid ejection apparatus including two nozzle arrays, the nozzles in the second nozzle array may be shifted from the nozzles in the first nozzle array by ½ of the nozzle pitch in the sub-scanning direction. In a liquid ejection apparatus including six nozzle arrays, the nozzles in the second nozzle array may be shifted from the nozzles in the first nozzle array by ⅙ of the nozzle pitch in the sub-scanning direction, the nozzles in the third nozzle array may be shifted from the nozzles in the second nozzle array by ⅙ of the nozzle pitch in the sub-scanning direction, the nozzles in the fourth nozzle array may be shifted from the nozzles in the third nozzle array by ⅙ of the nozzle pitch in the sub-scanning direction, the nozzles in the fifth nozzle array may be shifted from the nozzles in the fourth nozzle array by ⅙ of the nozzle pitch in the sub-scanning direction, and the nozzles in the sixth nozzle array may be shifted from the nozzles in the fifth nozzle array by ⅙ of the nozzle pitch in the sub-scanning direction.

In the above-described embodiment, the nozzle pitch is 1/300 inch, an image with a resolution of 600 dpi in the main scanning direction and a resolution of 600 dpi in the sub-scanning direction is printed in the high-speed mode. However, the nozzle pitch of the liquid ejection apparatus and the resolution of a formed image are not limited to the above values. The present disclosure may also be applied to liquid ejection apparatuses having other nozzle pitches and liquid ejection apparatuses that form images with other resolutions.

What is claimed is:

1. A liquid ejection apparatus comprising:

a head including at least a first nozzle array, a second nozzle array, a third nozzle array and a fourth nozzle array, the first nozzle array including nozzles arranged at a particular pitch in a first direction, the second nozzle array including nozzles arranged at the particular pitch in the first direction, the nozzles in the second nozzle array being located at positions shifted from the nozzles in the first nozzle array in the first direction, the third nozzle array including nozzles arranged at the particular pitch in the first direction, the fourth nozzle array including nozzles arranged at the particular pitch in the first direction, the nozzles in the third nozzle array being located at positions shifted from the nozzles in the first nozzle array and the second nozzle array in the first direction, the nozzles in the fourth nozzle array being located at positions shifted from the nozzles in the first nozzle array, the second nozzle array, and the third nozzle array in the first direction;

a carriage on which the head is mounted, the carriage being configured to move in a second direction crossing the first direction;

a memory; and a controller configured to:

acquire ejection control data, the ejection control data being generated based on image data for one line of an image to be formed, the ejection control data including first data and second data, the first data indicating an amount of liquid ejected from a first nozzle in the first nozzle array, the second data indicating an amount of liquid ejected from a second nozzle in the second nozzle array, the second nozzle being located at a position shifted from the first nozzle in the first direction, the second nozzle being closest to the first nozzle among the nozzles in the second nozzle array, the ejection control data being generated by distributing a plurality of data included in the image data for one line into the first data and the second data alternately in an arrangement order of the plurality of data;

acquire second ejection control data, the second ejection control data being generated based on image data for second one line of the image to be formed, the second ejection control data including third data and fourth data, the third data indicating an amount of liquid ejected from a third nozzle in the third nozzle array, the fourth data indicating an amount of liquid ejected from a fourth nozzle in the fourth nozzle array, the third nozzle being located at a position shifted from the second nozzle in the first direction, the third nozzle being closest to the second nozzle among the nozzles in the third nozzle array, the fourth nozzle being located at a position shifted from the third nozzle in the first direction, the fourth nozzle being closest to the third nozzle among the nozzles in the fourth nozzle array, the second ejection control data being generated by distributing a plurality of data included in the image data for the second one line into the third data and the fourth data alternately in an arrangement order of the plurality of data;

store the acquired ejection control data and the acquired second ejection control data in the memory; and perform an ejection operation of, while moving the carriage once, controlling the head to eject liquid from the first nozzle based on the first data included in the ejection control data stored in the memory, to eject liquid from the second nozzle based on the second data included in the ejection control data stored in the memory, to eject liquid from the third nozzle based on the third data included in the second ejection control data stored in the memory, and to eject liquid from the fourth nozzle based on the fourth data included in the second ejection control data stored in the memory, the memory being configured to store the ejection control data of an amount that is smaller than or equal to an amount required for performing the ejection operation twice.

2. The liquid ejection apparatus according to claim 1, wherein the controller is configured to receive the ejection control data, the ejection control data being generated in an external apparatus and transmitted from the external apparatus.

3. The liquid ejection apparatus according to claim 2, wherein a nozzle in the second nozzle array is arranged between two adjacent nozzles in the first nozzle array in the first direction; and wherein the ejection control data is generated in the external apparatus by distributing the plurality of data included in the image data for one line into the first data and the second data alternately in the arrangement order of the plurality of data.

4. The liquid ejection apparatus according to claim 1, wherein the controller is configured to:

receive the image data transmitted from an external apparatus; and generate the ejection control data based on the received image data.

5. The liquid ejection apparatus according to claim 4, wherein a nozzle in the second nozzle array is arranged between two adjacent nozzles in the first nozzle array in the first direction; and wherein the controller is configured to generate the ejection control data by distributing the plurality of data included in the image data for one line into the first data and the second data alternately in the arrangement order of the plurality of data.

6. The liquid ejection apparatus according to claim 1, wherein the controller is configured to start acquiring the ejection control data after an end of the ejection operation and complete acquiring the ejection control data before a start of the ejection operation next time.

7. The liquid ejection apparatus according to claim 1, wherein the controller is configured to:

control the head to eject liquid from the nozzles during a constant-speed movement of the carriage;

determine whether acquiring the ejection control data ends before a start of the ejection operation next time; and in response to determining that acquiring the ejection control data does not end before the start of the ejection operation next time, stop the carriage until acquiring the ejection control data ends.

8. The liquid ejection apparatus according to claim 1, wherein the controller is configured to:

control the head to eject liquid from the nozzles during a constant-speed movement, an acceleration movement, and a deceleration movement of the carriage;

determine whether acquiring the ejection control data ends before a start of the ejection operation next time; and in response to determining that acquiring the ejection control data does not end before the start of the ejection operation next time, move a direction change position of the carriage farther from an original position.

9. The liquid ejection apparatus according to claim 1, wherein the memory is configured to store the ejection control data of an amount required for performing the ejection operation once.

10. The liquid ejection apparatus according to claim 1, wherein the controller is configured to:

in a case where the memory has a free area for storing the ejection control data of an amount larger than an amount required for performing the ejection operation once, store the ejection control data of an amount larger than the amount required for performing the ejection operation once in the free area of the memory.

11. The liquid ejection apparatus according to claim 1, wherein the controller is configured to:

set an ejection start timing of liquid from the second nozzle to be later than an ejection start timing of liquid from the first nozzle.

12. The liquid ejection apparatus according to claim 1, wherein the controller is configured to perform:

a first mode in which the first nozzle in the first nozzle array and the second nozzle in the second nozzle array, in combination, eject liquid to form one line of the image; and a second mode in which the first nozzle ejects liquid to form one line of the image and the second nozzle ejects liquid to form another line of the image.

13. A liquid ejection system comprising:

a head including at least a first nozzle array, a second nozzle array, a third nozzle array and a fourth nozzle array, the first nozzle array including nozzles arranged at a particular pitch in a first direction, the second nozzle array including nozzles arranged at the particular pitch in the first direction, the nozzles in the second nozzle array being located at positions shifted from the nozzles in the first nozzle array in the first direction, the third nozzle array including nozzles arranged at the particular pitch in the first direction, the fourth nozzle array including nozzles arranged at the particular pitch in the first direction, the nozzles in the third nozzle array being located at positions shifted from the nozzles in the first nozzle array and the second nozzle array in the first direction, the nozzles in the fourth nozzle array being located at positions shifted from the nozzles in the first nozzle array, the second nozzle array, and the third nozzle array in the first direction;

a carriage on which the head is mounted, the carriage being configured to move in a second direction crossing the first direction;

a memory;

a first controller configured to:

generate ejection control data based on image data for one line of an image to be formed, the ejection control data including first data and second data, the first data indicating an amount of liquid ejected from a first nozzle in the first nozzle array, the second data indicating an amount of liquid ejected from a second nozzle in the second nozzle array, the second nozzle being located at a position shifted from the first nozzle in the first direction, the second nozzle being closest to the first nozzle among the nozzles in the second nozzle array, the ejection control data being generated by distributing a plurality of data included in the image data for one line into the first data and the second data alternately in an arrangement order of the plurality of data; and generate second ejection control data based on image data for second one line of the image to be formed, the second ejection control data including third data and fourth data, the third data indicating an amount of liquid ejected from a third nozzle in the third nozzle array, the fourth data indicating an amount of liquid ejected from a fourth nozzle in the fourth nozzle array, the third nozzle being located at a position shifted from the second nozzle in the first direction, the third nozzle being closest to the second nozzle among the nozzles in the third nozzle array, the fourth nozzle being located at a position shifted from the third nozzle in the first direction, the fourth nozzle being closest to the third nozzle among the nozzles in the fourth nozzle array, the second ejection control data being generated by distributing a plurality of data included in the image data for the second one line into the third data and the fourth data alternately in an arrangement order of the plurality of data; and a second controller configured to:

acquire the ejection control data for each line of the image data, the ejection control data being generated by the first controller;

acquire the second ejection control data for the second one line of the image data, the second ejection control data being generated by the first controller;

store the acquired ejection control data and the acquired second ejection control data in the memory; and perform an ejection operation of, while moving the carriage once, controlling the head to eject liquid from the first nozzle based on the first data included in the ejection control data stored in the memory, to eject liquid from the second nozzle based on the second data included in the ejection control data stored in the memory, to eject liquid from the third nozzle based on the third data included in the second ejection control data stored in the memory, and to eject liquid from the fourth nozzle based on the fourth data included in the second ejection control data stored in the memory, the memory being configured to store the ejection control data of an amount that is smaller than or equal to an amount required for performing the ejection operation twice.

14. A non-transitory computer-readable storage medium storing a set of program instructions for a liquid ejection apparatus comprising a head including at least a first nozzle array, a second nozzle array, a third nozzle array and a fourth nozzle array, the first nozzle array including nozzles arranged at a particular pitch in a first direction, the second nozzle array including nozzles arranged at the particular pitch in the first direction, the nozzles in the second nozzle array being located at positions shifted from the nozzles in the first nozzle array in the first direction, the third nozzle array including nozzles arranged at the particular pitch in the first direction, the fourth nozzle array including nozzles arranged at the particular pitch in the first direction, the nozzles in the third nozzle array being located at positions shifted from the nozzles in the first nozzle array and the second nozzle array in the first direction, the nozzles in the fourth nozzle array being located at positions shifted from the nozzles in the first nozzle array, the second nozzle array, and the third nozzle array in the first direction, a carriage on which the head is mounted, the carriage being configured to move in a second direction crossing the first direction, a memory, and a controller, the set of program instructions, when executed by the controller, causing the liquid ejection apparatus to perform:

acquiring ejection control data, the ejection control data being generated based on image data for one line of an image to be formed, the ejection control data including first data and second data, the first data indicating an amount of liquid ejected from a first nozzle in the first nozzle array, the second data indicating an amount of liquid ejected from a second nozzle in the second nozzle array, the second nozzle being located at a position shifted from the first nozzle in the first direction, the second nozzle being closest to the first nozzle among the nozzles in the second nozzle array, the ejection control data being generated by distributing a plurality of data included in the image data for one line into the first data and the second data alternately in an arrangement order of the plurality of data;

acquiring second ejection control data, the second ejection control data being generated based on image data for second one line of the image to be formed, the second ejection control data including third data and fourth data, the third data indicating an amount of liquid ejected from a third nozzle in the third nozzle array, the fourth data indicating an amount of liquid ejected from a fourth nozzle in the fourth nozzle array, the third nozzle being located at a position shifted from the second nozzle in the first direction, the third nozzle being closest to the second nozzle among the nozzles in the third nozzle array, the fourth nozzle being located at a position shifted from the third nozzle in the first direction, the fourth nozzle being closest to the third nozzle among the nozzles in the fourth nozzle array, the second ejection control data being generated by distributing a plurality of data included in the image data for the second one line into the third data and the fourth data alternately in an arrangement order of the plurality of data;

storing the acquired ejection control data and the acquired second ejection control data in the memory; and performing an ejection operation of, while moving the carriage once, controlling the head to eject liquid from the first nozzle based on the first data included in the ejection control data stored in the memory, to eject liquid from the second nozzle based on the second data included in the ejection control data stored in the memory, to eject liquid from the third nozzle based on the third data included in the second ejection control data stored in the memory, and to eject liquid from the fourth nozzle based on the fourth data included in the second ejection control data stored in the memory, the memory being configured to store the ejection control data of an amount that is smaller than or equal to an amount required for performing the ejection operation twice.

* * * * *